US006684055B1

(12) United States Patent
Blackaby et al.

(10) Patent No.: US 6,684,055 B1
(45) Date of Patent: Jan. 27, 2004

(54) SYSTEM FOR REMOTELY COMMUNICATING VOICE AND DATA TO AND FROM AN ELEVATOR CONTROLLER

(75) Inventors: Barry G. Blackaby, Avon, CT (US); Timothy M. Remmers, New Hartford, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/484,506

(22) Filed: Jan. 18, 2000

(51) Int. Cl.[7] ................................................ H04B 7/15

(52) U.S. Cl. .................. 455/11.1; 455/422.1; 455/524; 455/128; 340/3.1; 340/825.69

(58) Field of Search ............................... 455/422, 11.1, 455/524, 575, 463, 555, 128, 422.1, 525, 41.2; 187/396; 340/3.1–3.9, 539.1, 539.32, 825.69, 825.72, 286.01, 690

(56) References Cited

U.S. PATENT DOCUMENTS

| | | | | | |
|---|---|---|---|---|---|
| 4,568,909 | A | | 2/1986 | Whynacht .................... | 340/21 |
| 4,622,538 | A | * | 11/1986 | Whynacht et al. ....... | 340/539.1 |
| 4,941,207 | A | * | 7/1990 | Maeda et al. .............. | 455/41.2 |
| 4,979,593 | A | * | 12/1990 | Watanabe et al. ........... | 187/245 |
| 5,282,239 | A | * | 1/1994 | Yokoi et al. .................. | 379/58 |
| 5,291,193 | A | * | 3/1994 | Isobe et al. ............ | 340/825.69 |
| 5,349,631 | A | * | 9/1994 | Lee ............................ | 455/463 |
| 5,463,673 | A | * | 10/1995 | Herscovici .................... | 379/59 |
| 5,603,080 | A | * | 2/1997 | Kallander et al. .......... | 455/525 |
| 5,668,562 | A | * | 9/1997 | Cutrer et al. ............... | 343/703 |
| 5,673,307 | A | * | 9/1997 | Holland et al. ............... | 379/60 |
| 5,817,994 | A | | 10/1998 | Fried et al. ................. | 187/391 |
| 5,889,239 | A | * | 3/1999 | Blackaby et al. ........... | 187/391 |
| 6,032,035 | A | * | 2/2000 | Webster et al. ............. | 455/404 |
| 6,108,535 | A | * | 8/2000 | Moriya et al. .............. | 455/422 |
| 6,265,964 | B1 | * | 7/2001 | Payne ................... | 340/286.01 |
| 6,288,688 | B1 | * | 9/2001 | Hughes et al. .............. | 187/396 |
| 6,356,204 | B1 | * | 3/2002 | Guindi et al. .............. | 340/690 |
| 6,437,692 | B1 | * | 8/2002 | Petite et al. ............. | 340/539.1 |
| 6,498,789 | B1 | * | 12/2002 | Honda ........................ | 370/342 |

FOREIGN PATENT DOCUMENTS

| | | |
|---|---|---|
| JP | 09297895 | 11/1997 |
| WO | WO 99/43587 | 9/1999 |

* cited by examiner

*Primary Examiner*—Edward F. Urban
*Assistant Examiner*—Lana Le

(57) ABSTRACT

A wireless communications system for use with an elevator system in a building includes a first transceiver connected to an elevator controller and a second transceiver located remotely within the building. The first and second transceivers each have antennas which allow wireless transmission of data between the transceivers. A building monitoring center is hard-wired to the second transceiver to allow personnel to monitor and interact with each elevator controller. A third transceiver and antenna are located outside of the building and are connected to a central monitoring station to allow remote monitoring and interaction with each elevator controller. The wireless communications system can be used with a network of elevators where each elevator has a unique electronic address to allow discreet wireless communications with a specific elevator.

7 Claims, 3 Drawing Sheets

FIG.2
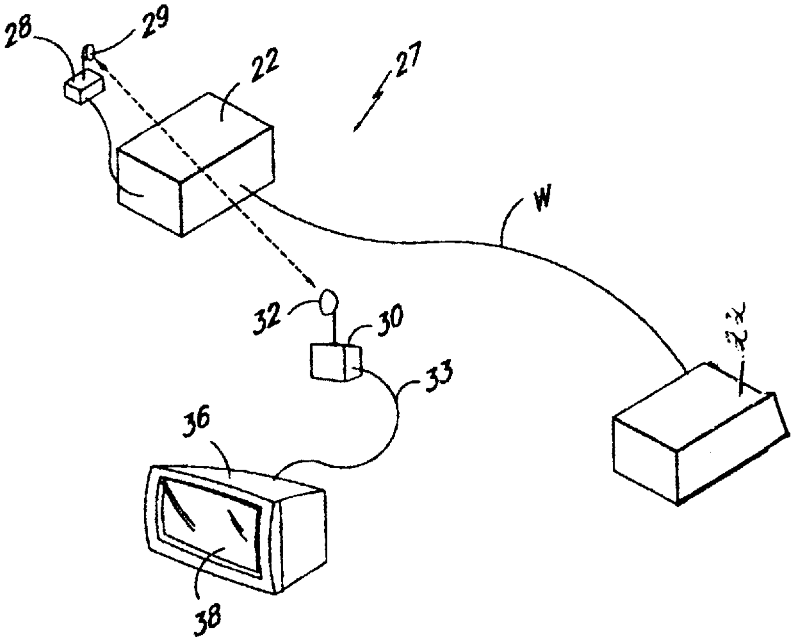
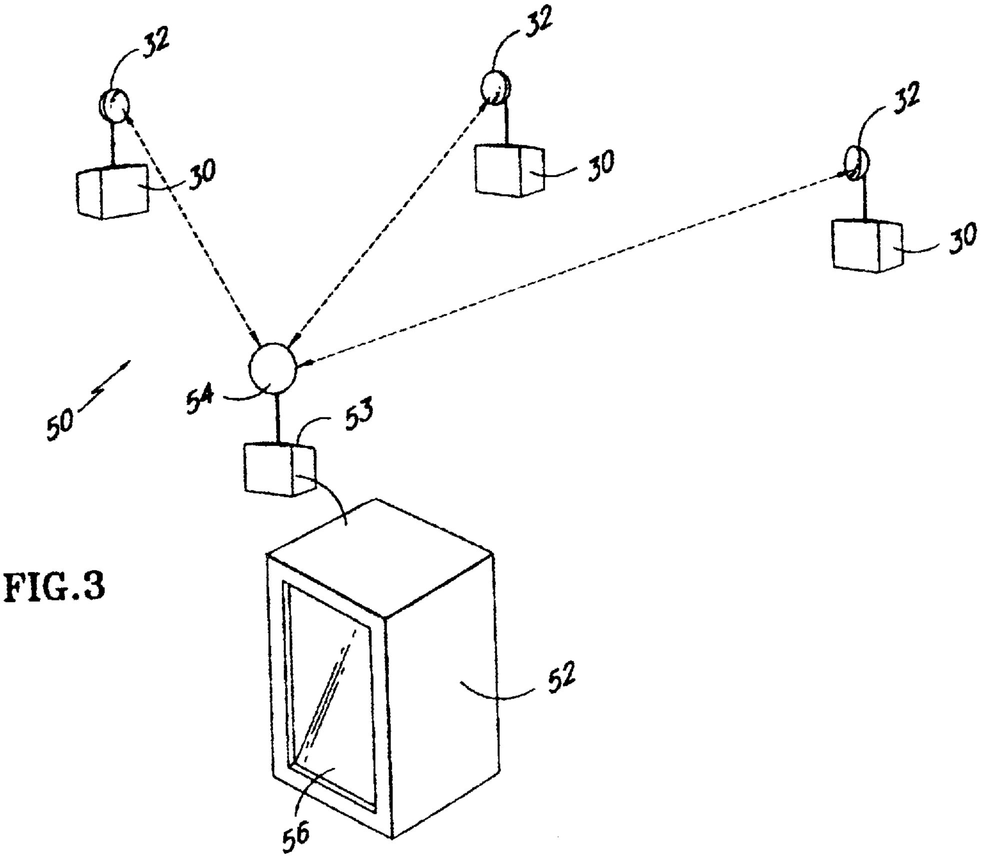
FIG.3

SYSTEM FOR REMOTELY COMMUNICATING VOICE AND DATA TO AND FROM AN ELEVATOR CONTROLLER

BACKGROUND OF THE INVENTION

1. Technical Field

The present invention relates to an elevator system and, more particularly, to a wireless elevator communications system for transmitting voices and operating data between an elevator and a monitoring center.

2. Background Art

The practice of hard wiring together multiple elevator systems to form a communications system is known in the art. In buildings with multiple elevators, each elevator transmits its performance and operating data through hard wiring to a local monitoring center, which then compiles the data for on-site review or subsequent transmission to a central station capable of monitoring elevators of several buildings. Public phone lines are typically used to connect the local monitoring center with the central monitoring station.

The current state of the art creates a communications system by hard wiring together a network of elevator systems, which can be impractical or impossible in some applications. In a building with multiple elevators, hard wiring the elevators to a local monitoring center is a difficult, cumbersome and expensive task which involves routing communication cables and wiring around or through obstacles such as floors and walls. When voice and data communications are transmitted between the monitoring center and the control station using public phone lines substantial use and maintenance expenses are incurred.

There is a need for an elevator communications system that does not require expensive hard wiring in each building or the high cost associated with the extensive use and maintenance of public phone lines in a network of multiple elevator systems in separate buildings.

DISCLOSURE OF THE INVENTION

It is an object of the present invention to provide a voice and data communications system that is easier and cheaper to install and use by eliminating the need for hard wiring between elevators in separate buildings.

It is another object of the present invention to provide a common monitoring station to simplify the monitoring, collecting, or changing of operating data for an array of elevators.

According to the present invention, a wireless communications system for use in a building with at least one electronically controlled elevator system includes a first transceiver attached to an electronic elevator controller and a second transceiver attached to a local monitoring center located in the building. The first transceiver has a first antenna which transmits data to and from a second antenna attached to the second transceiver. The communications system of the present invention may also include a second monitoring center having a third transceiver which communicates with the second transceiver to enable monitoring of the elevator from outside of the building. The first transceiver has a unique electronic address allowing discreet communications between the elevator and monitoring center in a communication system with multiple elevators.

According to one embodiment of the present invention, a mobile transceiver can be used with the communications network to allow emergency personnel to communicate from a safe location with any of the elevators within the functional range of the mobile transceiver.

According to another embodiment of the present invention, transceivers of neighboring communications systems are used to link the systems in the event that a monitoring center fails.

One advantage of the present invention is that hard wiring is no longer required to link multiple elevators in a single building. Operating data is transmitted between the elevators and a monitoring center using wireless transceivers.

Another advantage of the present invention is that hard wiring is no longer required to link elevator systems in separate buildings. The elevators are networked together using remote transceivers, thereby eliminating use of some phone lines, reducing monthly phone line expenses, and simplifying the installation of the entire network.

These and other objects, features and advantages of the present invention will become more apparent in the light of the following detailed description of best mode embodiments thereof as illustrated in the accompanying drawings.

BRIEF DESCRIPTION OF THE DRAWINGS

FIG. 2 is an enlarged schematic view of the building communications system of FIG. 1 shown with a building monitoring center and controller transceivers;

FIG. 3 is a schematic view of an area communications system including building monitoring centers linked to a central station via telephone line;

BEST MODE FOR CARRYING OUT THE INVENTION

Figure 1:
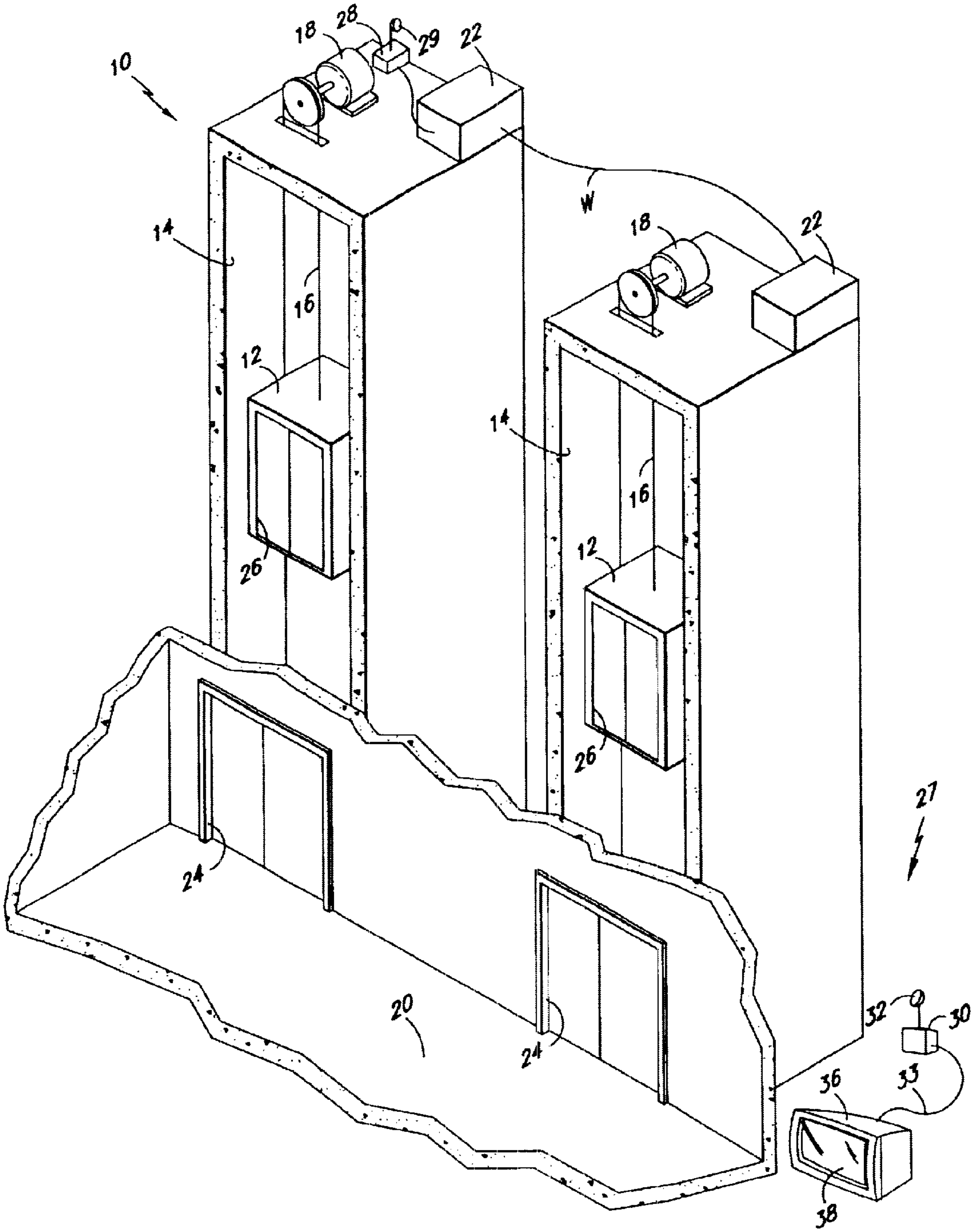
FIG. 1 is a partially broken-away schematic view of an elevator system network, with a floor landing in a building shown having two elevator systems and a building communications system.

Referring to FIG. 1, an elevator system network 10 includes a plurality of elevator cars 12, each of which is supported in a hoistway 14. Each elevator car 12 is attached to a respective rope 16 with a motor 18 driving each rope 16 to move each elevator car 12 independently between floor landings 20 of the building. Each motor 18 receives electronic direction and speed commands from a controller 22 dedicated to each elevator. Each elevator hoistway 14 has a hoistway doorway opening 24 at the floor landing 20 for the ingress and egress of passengers. The elevator cars 12 have car doorways 26 that cooperate with the hoistway doorway openings 24.

The elevator system network 10 also includes a building communications network 27 for wireless communications and monitoring of elevators therein, as can also be seen in FIG. 2. The building communications network 27 includes a controller transceiver 28 connected to a controller transceiver antenna 29 which is hard wired to one of the controllers 22 in the elevator system network 10. Each of the controllers 22 in the building is connected to the controller transceiver 28 via a suitable hard wire, as indicated by the letter W.

The building communications network 27 also includes a building transceiver 30 with a building transceiver antenna 32. The building transceiver 30 is connected via telephone line 33 to a monitoring center 36 with a display screen 38.

Referring to FIG. 3, an area communications system 50 includes a central station 52, which communicates with the building transceivers 30. The central station 52 is hard wired to a central station transceiver 53 having an omni-directional station transceiver antenna 54. Preferably, the hard wiring between the central station 52 and central station transceiver 53 is telephone line. The transceiver antenna 54 communicates with the building transceiver antennas 32 located in the network 50. A central station display screen 56 displays elevator operating data of any elevator in the area communications network 50.

Figure 4:
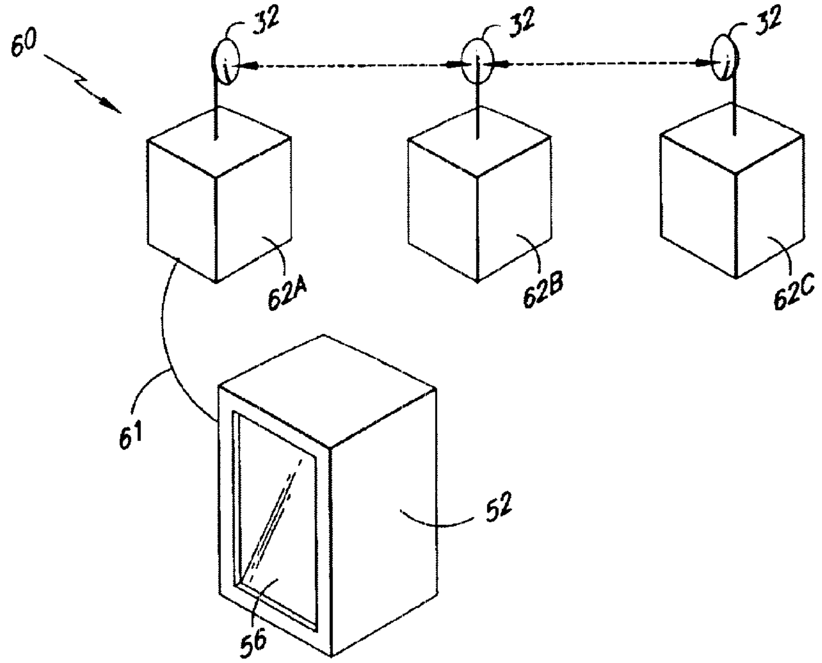
FIG. 4 is a schematic view of an area communications system similar to that shown in FIG. 3 except that a wireless communication link is used between one of the building monitoring centers and the central station.

Referring to FIG. 4, an area communication system 60 includes a central station 52 which communicates which is linked via telephone line 61 to building transceiver 62A. Building transceivers 62A, 62B and 62C are in wireless communication with each other using transceiver antennas 32, and any of the building transceivers is reachable from the central station 52 via the telephone line 61connected between the building transceiver 62A and the central station 52.

Figure 5:
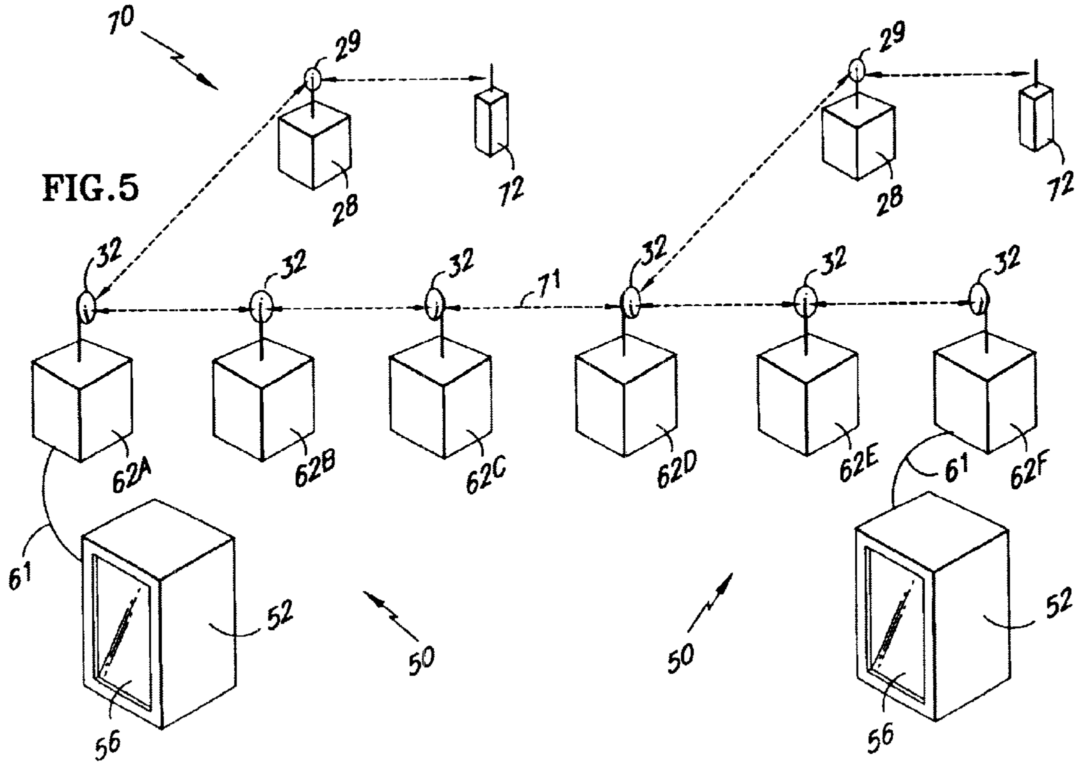
FIG. 5 is a schematic view of two adjacently located area communications systems linked together via their building monitoring centers.

Referring to FIG. 5, a wide area communication network 70 includes at least two adjacently located area communication systems 60. For illustrative purposes, the building transceivers 62 have been labeled with the letters A through F, with building transceivers 62A, 62B and 62C belonging to one area communication system 60, and building transceivers 62D, 62E and 62F belonging to the adjacent area communication system 60.

Each of the two area communication systems 60 have their own central station 52 which is hard-wired to building transceivers 62A and 62F, respectively. Building transceivers 62C and 62D are located within operable wireless transmission range of one another, as indicated by arrow 71, so that in the event that one of the central stations 52 fails or is inoperable for some reason, the building transceivers of the effected area communication system 60 can be reached via the central station 52 of the adjacent communication system 60.

A hand-held control unit 72 can communicate with any controller transceiver 28 if the control unit 72 is within its operable communication range of the transceiver 28.

In operation, the building communications network 27 is used in a building having one or more elevator systems, with each elevator system having a dedicated controller, as best seen in FIG. 1. The controllers 22 are hard-wired together, and one of the controllers is equipped with a transceiver 28 with a unique electronic address. However, the embodiment of FIG. 1 presumes that the elevators are situated such that a hard wire connection between the elevators is possible. In the alternative, each elevator can be configured with its own controller transceiver 28 and antenna 29 so that the building transceiver 30 can communicate with each elevator controller 22.

The building monitoring center 36 is programmed with the electronic address of the transceiver 28 and is capable of communicating with any of the elevators in the network via the single transceiver 28. In this manner, a maintenance or emergency worker can contact or monitor any specific elevator by entering the electronic address for the specific controller. After entering an electronic address, emergency or maintenance personnel view the display screen 38 to monitor or change operating data of any of the elevators or communicate verbally with elevator occupants. Thus, the building monitoring center 36 is located in the building so as to provide emergency or maintenance personnel with a safe, convenient location to control, monitor or communicate with each elevator in the elevator system network 10.

The area communications network 50 is formed with multiple building communication networks 27 located within an operable transceiving range of the central station 52, as best seen in FIG. 3. The operable transceiving range is a function of the type of transceiver used in the building communications networks 27. The central station 52 is programmed with the electronic addresses of all transceivers 28 in the network 27 so that personnel can use the display screen 56 to enter the appropriate electronic address and interact, via the building transceivers 30, with a specific controller 22, or verbally communicate with a person in any of the elevator cars. The wireless communications are transmitted from the central station 52 to the building transceiver 30, and finally to a specific controller 22 via its associated controller transceiver 28.

The area communications network 60 is similar to the area communications network 50, except that the central station 52 is hard wired to one of the building transceivers 30 instead of using a wireless link. The remaining building transceivers 30 have wireless transceivers and communicate with the central station 52 via the building transceiver 30 with the hard wire link to the central station 52.

The hand held unit 72 is used by maintenance or emergency personnel to interact with any elevator controller 22 as long as the unit 72 is within its operable transceiving range. As long as the electronic address of an elevator is known, a communication link can be established with that elevator via its elevator controller 22.

One advantage of the present invention is the reduction or elimination of hard wiring or telephone lines to communicate between a control center and multiple elevators in a building. Remote antennas attached to controllers and monitoring centers allow two-way wireless communications between the elevator controllers and building-monitoring center.

Another advantage of the present invention is that costly phone line service is not required to link elevator systems of separate buildings. The elevator systems are remotely linked together by antenna, and a single telephone line linking a control station to one elevator provides communications between the control station and any elevator in the network.

One type of transceiver that can be used as a controller transceiver 28, a building transceiver 30, or a central station transceiver 53 is model WIT 2400 manufactured by Digital Wireless Communications, of Norcross, Ga. This model transmits data in a 2.4 GHz frequency band, which is a known to be a noisy band because it is also used by microwave ovens. The WIT 2400 avoids the noise problem by utilizing a proprietary form of direct sequence spread spectrum technology, which transmits data between the transceivers in a random, rapidly changing sequence of frequencies. This technology ensures a robust communication link between transceivers that avoids interference or jamming. The 2.4 GHz frequency band also provides a secure, high bandwidth range to transmit data for distances up to one thousand meters (1000 m). This frequency band is unregulated in most countries across the globe, thus allowing for a nearly universal solution to wireless elevator communications.

Although the preferred embodiment uses a WIT 2400 transceiver and operates in the 2.4 GHz frequency band, other types of transceivers can be used and can operate at other frequency bands.

While preferred embodiments have been shown and described above, various modifications and substitutions may be made without departing from the spirit and scope of the invention. For example, while the present invention is described in connection with an electrically-driven elevator, the system is equally applicable to one that is driven hydraulically. Further, the local monitoring center functions as described whether the building has one or multiple elevators because each elevator is programmed with a unique electronic address. Additionally, within an area densely populated with area communication networks, it may be beneficial to use directionally sensitive building transceiver antennas to narrowly focus communications from the building communications network to the central station. Still further, the controller transceiver antenna may be positioned and mounted remotely from its associated transceiver to provide a clear path for communications between the building transceiver antenna and the controller transceiver antenna. Still even further, in lieu of a suitable telephone line to connect the central station to the central station transceiver, or to connect the building transceiver to the monitoring center, suitable wire can be routed to connect these components. In the alternative, hard wire connections such as phone line or suitable wire can be avoided altogether by using RF transmitters to communicate between the components. Accordingly, it is to be understood that the present invention has been described by way of example and not by way of limitation.

We claim:

1. An elevator monitoring system for monitoring the performance of elevators located within multiple buildings comprising:

a first elevator located within a first building, said elevator in communication with a first building transceiver for receiving elevator performance data from said first elevator;

a second elevator located within a second building, said second elevator in communication with a second building transceiver for receiving elevator performance data from said second elevator;

a third elevator located within a third building, said third elevator in communication with a third building transceiver for receiving elevator performance data from said third elevator, and wherein said building transceivers are in wireless communication with at least one of the other building transceivers for transmitting and receiving elevator performance data; and a first central monitoring station in communication with said first building transceiver for receiving elevator performance data from said first, second and third elevators.

2. The elevator monitoring system of claim 1 wherein the first central monitoring station is in communication with said first and second building transceivers for receiving elevator performance data from said first, second and third elevators, wherein said first central monitoring station receives said performance data from said first, second, and third elevators in the event that communication between said first central monitoring station and one of said first and second transceivers is interrupted.

3. The elevator monitoring system of claim 1 wherein communication between said first elevator and said first transceiver is wireless.

4. The elevator monitoring system of claim 1 wherein communication between said first central monitoring station and said first building transceiver is wireless.

5. The elevator monitoring system of any one of claims 3 or 4 wherein the performance data is transmitted using frequency hopping spread spectrum technique.

6. The elevator monitoring system of claim 1 wherein communication between said first central monitoring station and said first building is through a phone line.

7. The elevator monitoring system of claim 1 further comprising a second central monitoring station in communication with said second building transceiver for receiving elevator performance data from said first, second and third elevators.

* * * * *